(12) United States Patent
Bajulaz

(10) Patent No.: US 6,231,468 B1
(45) Date of Patent: May 15, 2001

(54) DESMODROMIC MECHANISM

(76) Inventor: Roger Bajulaz, Matutina Parc 22, avenue du Bouchet 1209 Geneva (CH)

( * ) Notice: Subject to any disclaimer, the term of this patent is extended or adjusted under 35 U.S.C. 154(b) by 0 days.

(21) Appl. No.: 09/381,092
(22) PCT Filed: Mar. 10, 1998
(86) PCT No.: PCT/IB98/00310
§ 371 Date: Sep. 15, 1999
§ 102(e) Date: Sep. 15, 1999
(87) PCT Pub. No.: WO98/41781
PCT Pub. Date: Sep. 24, 1998

(30) Foreign Application Priority Data

Mar. 18, 1997 (CH) .................................................. 662/97

(51) Int. Cl.$^7$ .................................................. F16H 1/28
(52) U.S. Cl. .............................. 475/166; 475/170; 74/89; 74/116; 74/122; 74/125
(58) Field of Search .................... 475/168, 166, 475/169, 170, 165, 196, 183, 346; 74/89, 89.15, 122, 125, 116

(56) References Cited

U.S. PATENT DOCUMENTS

| | | | |
|---|---|---|---|
| 1,194,288 | * | 8/1916 | Grisdale ................................ 475/166 |
| 1,449,352 | * | 3/1923 | Seeck ...................................... 74/63 |
| 1,470,560 | * | 10/1923 | Hall ...................................... 475/166 |
| 1,706,180 | * | 3/1929 | Morison ................................ 475/168 |
| 1,738,662 | * | 12/1929 | Morison ................................ 475/168 |
| 3,468,175 | | 9/1969 | Rabek . |
| 3,589,202 | * | 6/1971 | Stanley ...................................... 74/25 |
| 3,874,253 | * | 4/1975 | Waddington ........................ 475/166 |
| 3,910,733 | * | 10/1975 | Grove ................................. 418/61.3 |
| 3,931,958 | * | 1/1976 | Hobbs ............................... 475/170 X |
| 4,109,541 | * | 8/1978 | Jesse ...................................... 475/166 |
| 4,338,830 | * | 7/1982 | Rodaway ............................. 475/169 |
| 4,478,100 | * | 10/1984 | Sfredda ................................ 475/165 |
| 4,566,352 | * | 1/1986 | Stiff .................................. 475/159 X |
| 4,718,291 | * | 1/1988 | Wood et al. ........................ 74/89.15 |
| 4,856,378 | * | 8/1989 | Hvolka ................................ 475/168 |
| 4,909,102 | * | 3/1990 | Haga .................................... 475/168 |
| 5,197,930 | * | 3/1993 | Imase ................................... 475/168 |
| 5,423,725 | * | 6/1995 | Inoue ................................... 475/196 |
| 5,431,605 | * | 7/1995 | Ko ........................................ 475/168 |

FOREIGN PATENT DOCUMENTS

| | | |
|---|---|---|
| 338495 | 6/1921 | (DE) . |
| 1199257 | 7/1970 | (GB) . |
| 130956 * | 11/1988 | (JP) ..................................... 475/166 |
| 275834 * | 11/1988 | (JP) ..................................... 475/166 |

OTHER PUBLICATIONS

G. Dalpiaz et al., Tenth World Congress On The Theory Of Machines And Mechanisms, "A Model For The Elastodynamic Analysis Of A Desmodromic Valve Train", Oulu, Finland, Jun. 20–24, 1999.

* cited by examiner

Primary Examiner—Charles A Marmor
Assistant Examiner—Ha Ho
(74) Attorney, Agent, or Firm—Young & Thompson

(57) ABSTRACT

A desmodromic mechanism having transmission elements connected to and supported by an intermediate element and a primary and a secondary cam both in permanent contact with the transmission elements. The transmission elements, the intermediate element, the primary and secondary cams are assembled to one another to compulsorily move in rotation or linearly relative to one another. The various elements are also assembled in such a way as to form sealed variable volume chambers.

13 Claims, 8 Drawing Sheets

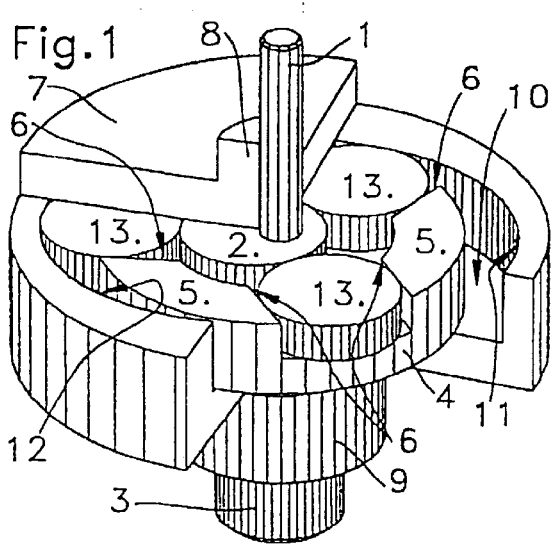
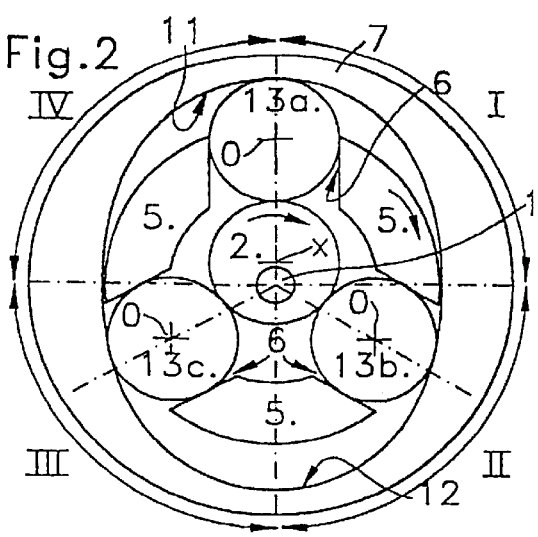
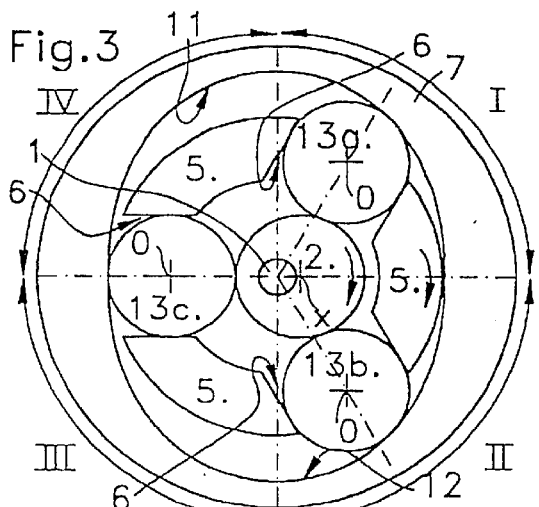
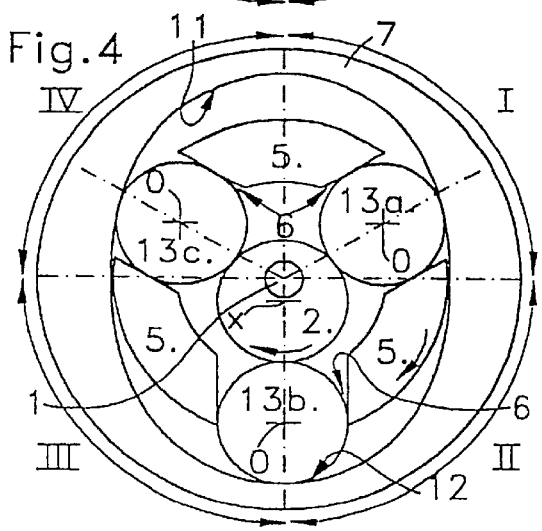
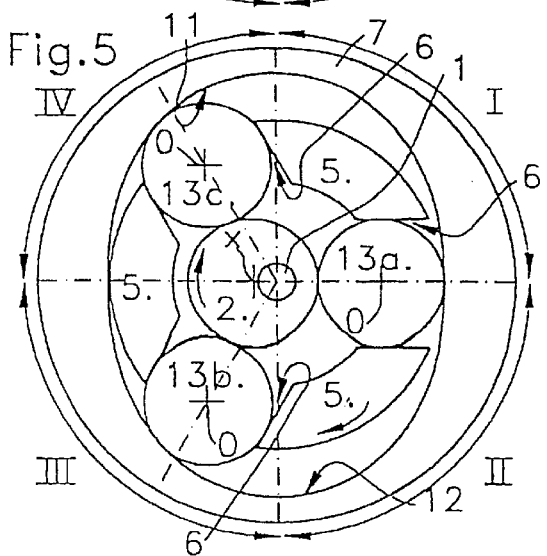
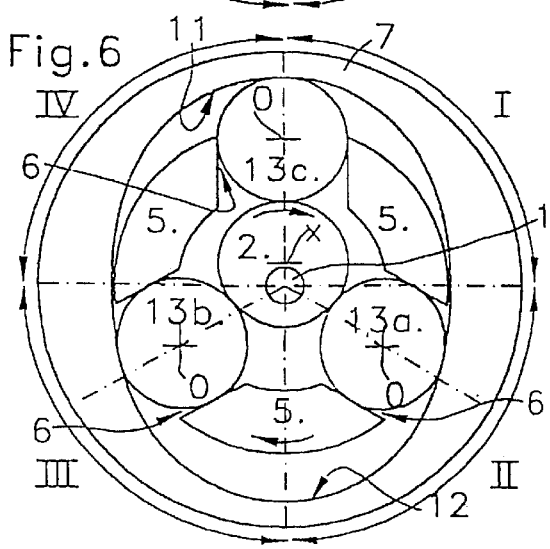

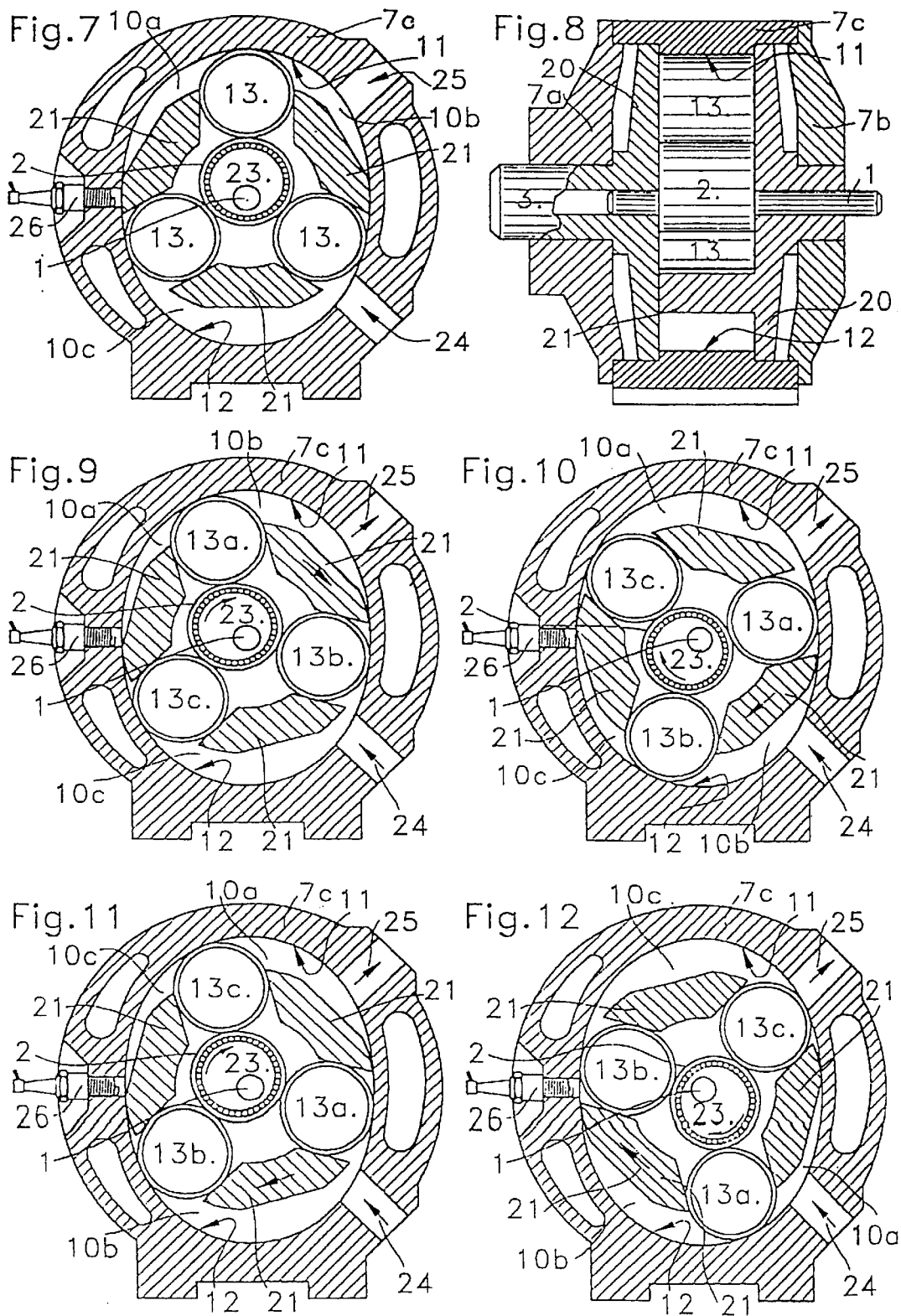

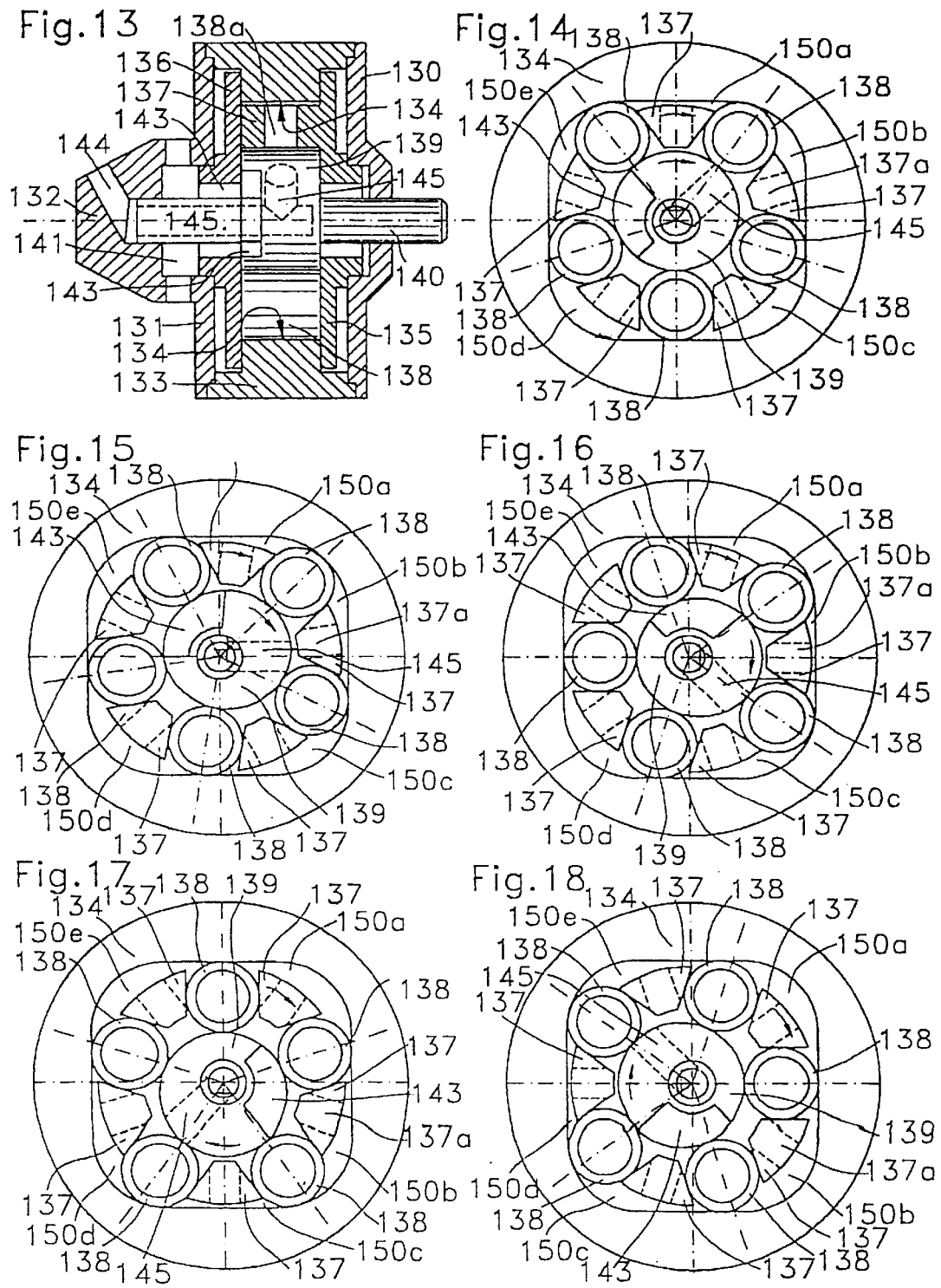

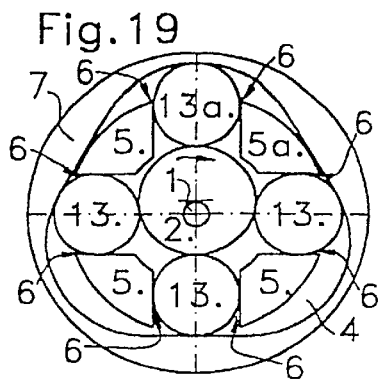
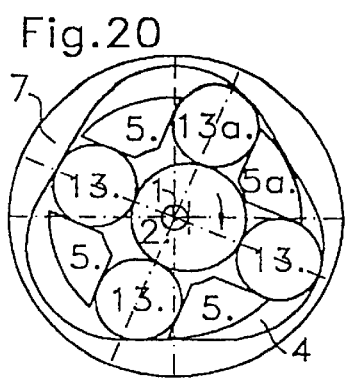
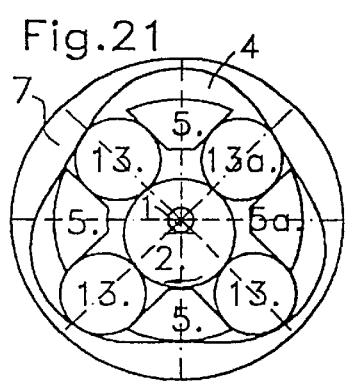
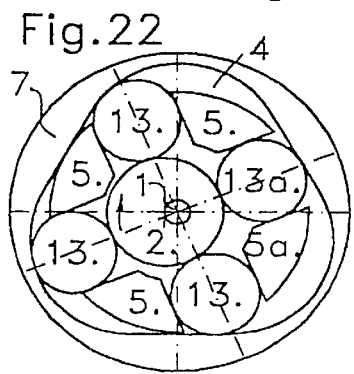
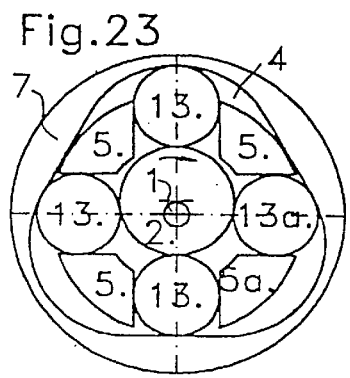
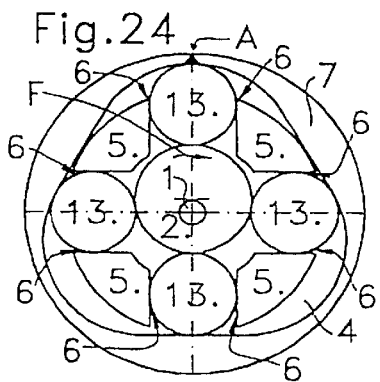
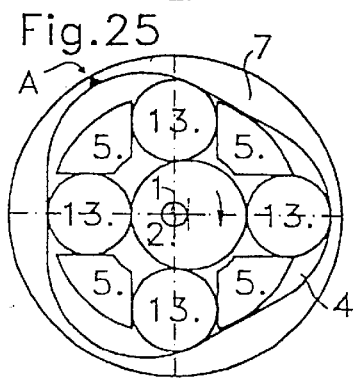
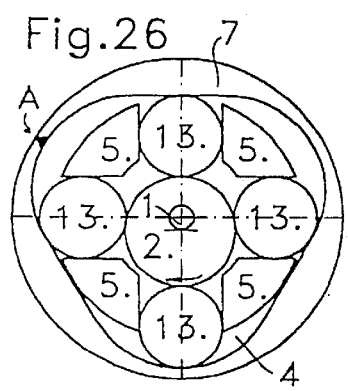
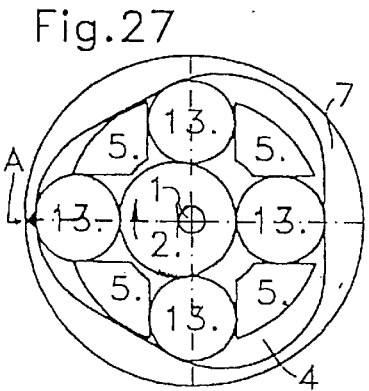
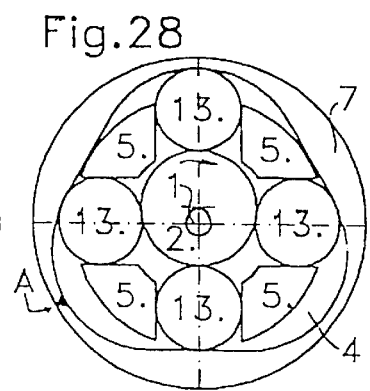

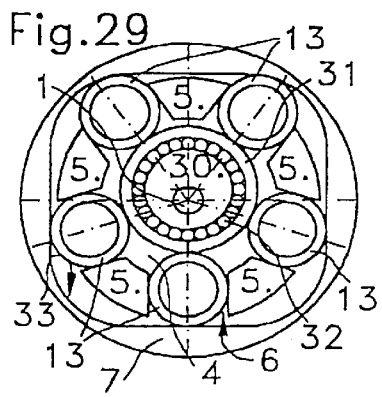
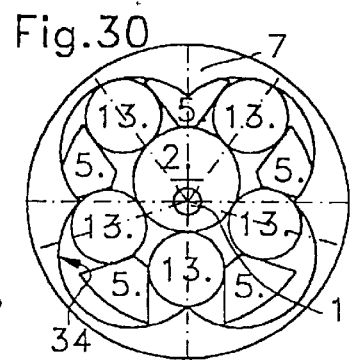
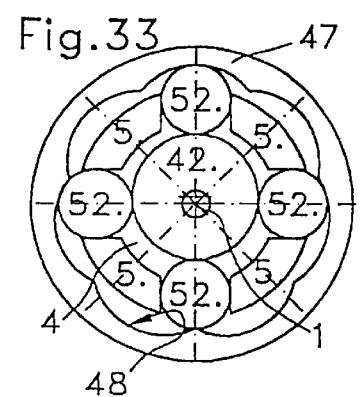
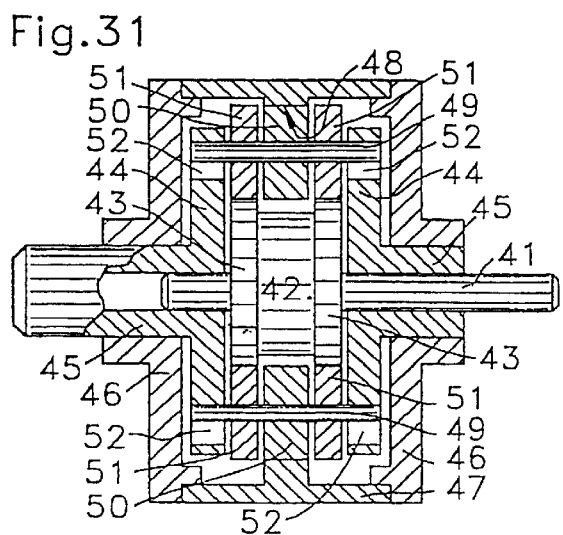
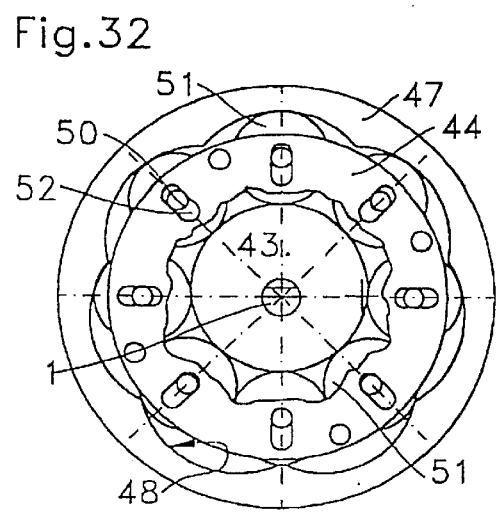
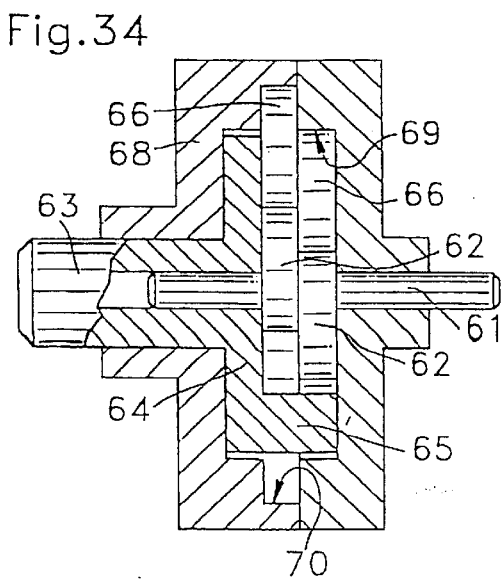
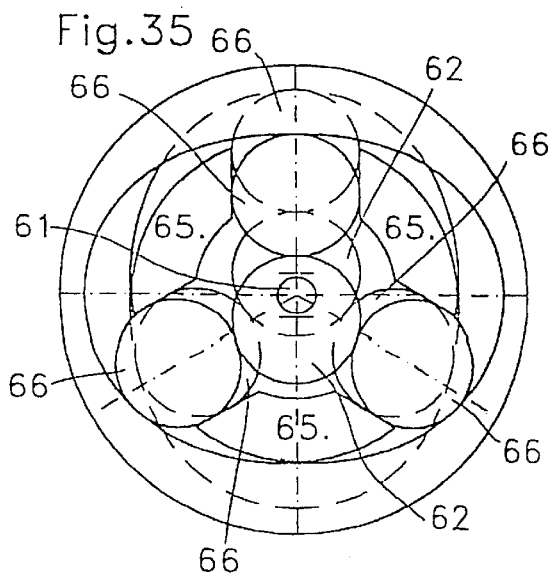

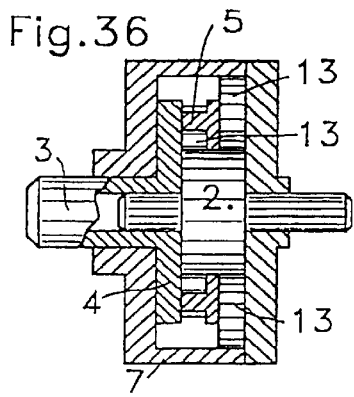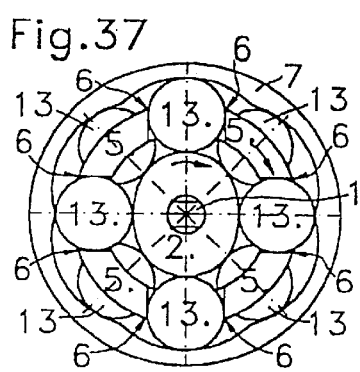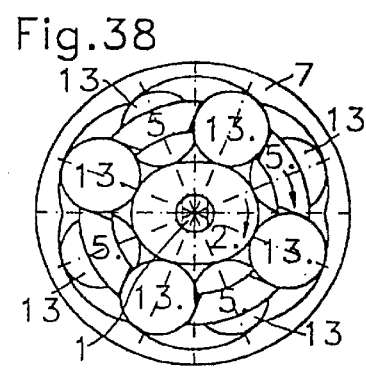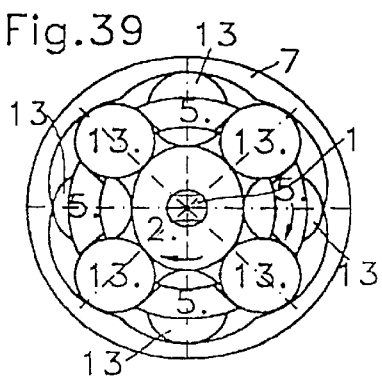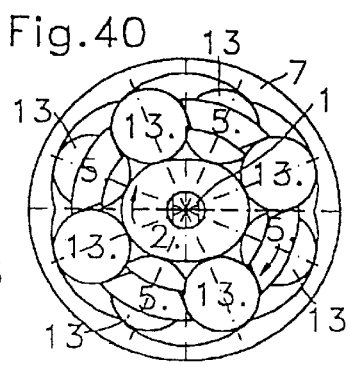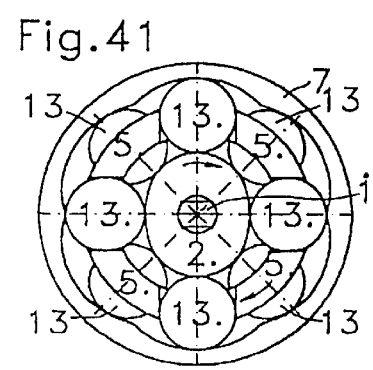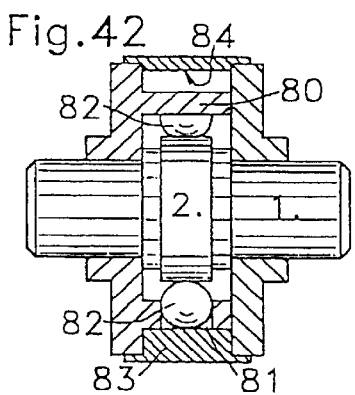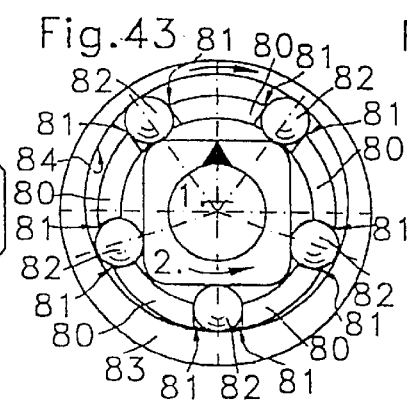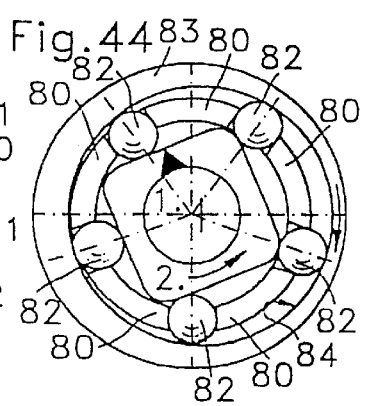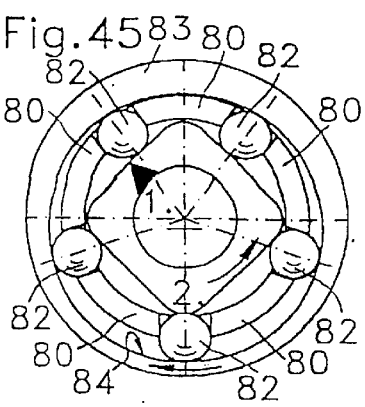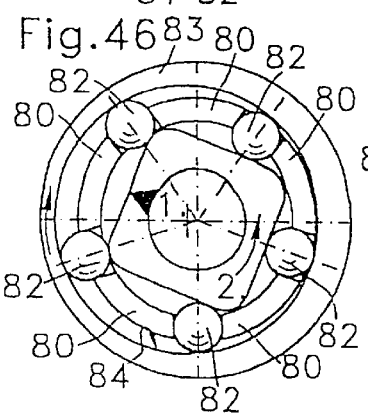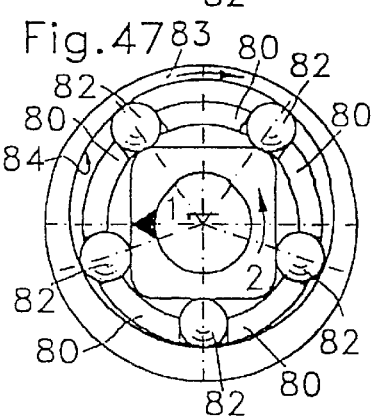

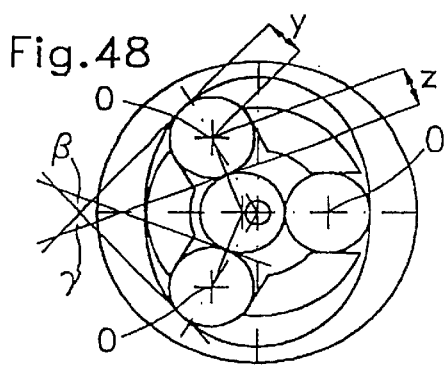

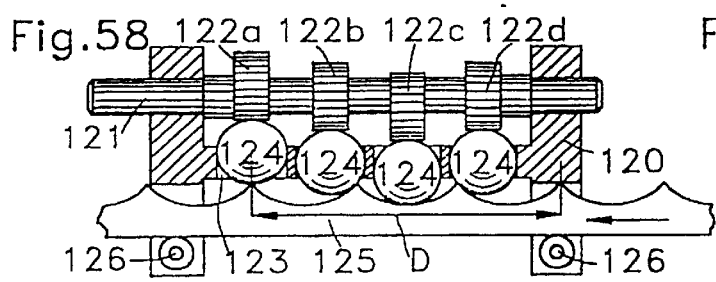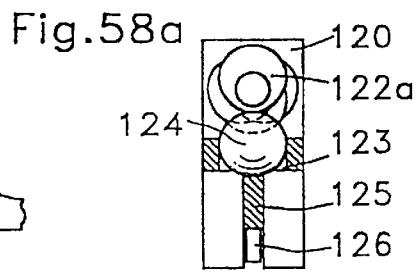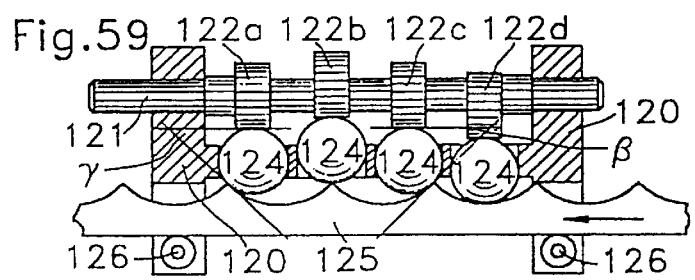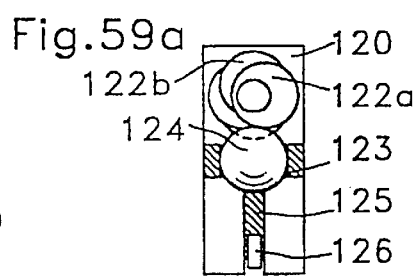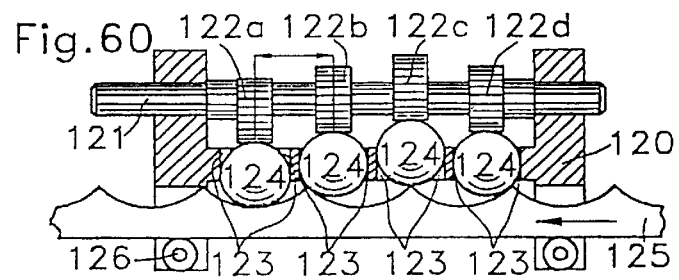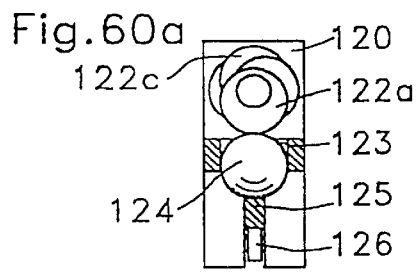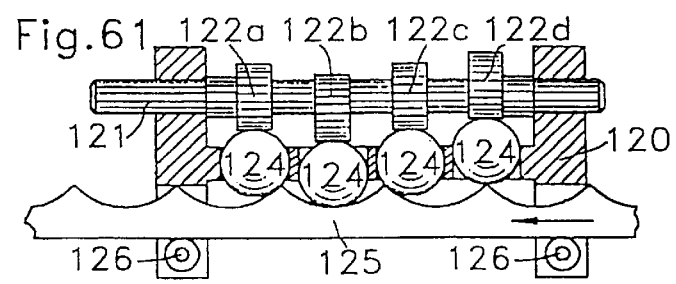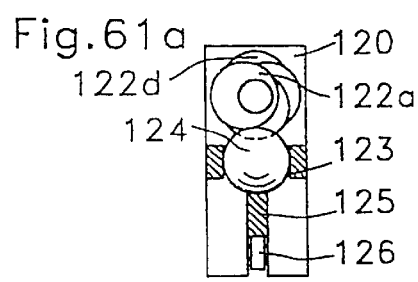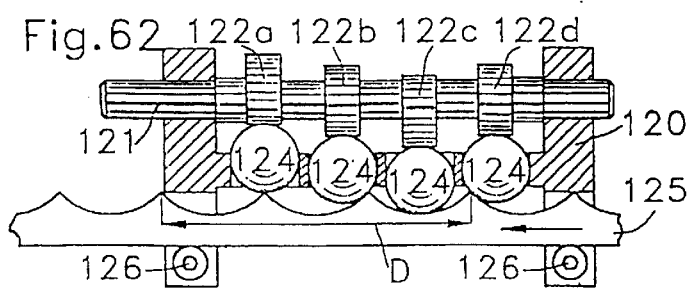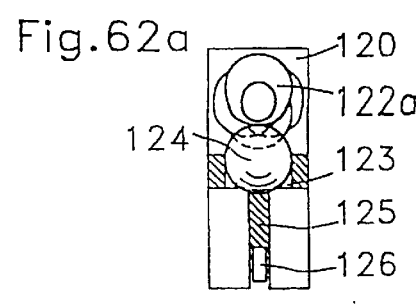

DESMODROMIC MECHANISM

BACKGROUND OF THE INVENTION

The present invention has for its object a desmodromic mechanism comprising a primary element and a secondary element mechanically interconnected by a desmodromic connection, which is to say such that the speed of one of said elements precisely determines a speed for the other.

Such mechanisms are found in speed changers, speed multipliers or reducers, hydraulic, pneumatic or internal combustion motors, compressors, pumps, jacks, linear actuators, etc.

To provide angular or linear drives for mechanisms whose object is to transmit movements permitting changing volumes to obtain pumps, compressors, etc., or to reduce or multiply speed with a certain precision, there is used gearing which has in certain cases major drawbacks, such as problems of lubrication, noise, size, difficulty to obtain movement without play, cost, etc.

The object is to provide the mechanisms mentioned above by a simple, precise and robust desmodromic system of a cost lower than that of conventional embodiments.

This system permits the use of plastic or ceramic materials under optimum conditions. It is possible to provide mechanisms which can operate without lubrication and have high mechanical resistance.

By the reduction of speed between the input shaft and the intermediate element carrying the transmitters, great improvements are enjoyed in the mechanisms relying on variable volume chambers.

The object of the present invention is to provide such a desmodromic mechanism which will be inexpensive, robust, easy to produce, which has no gearing and which permits producing linear or rotating motion of the driven element from a rotating movement of the motor element, or vice versa.

SUMMARY OF THE INVENTION

The present invention has for its object a desmodromic mechanism tending to overcome the mentioned drawbacks and permitting achieving the mentioned objects. This desmodromic mechanism is characterized by the combination of elements set forth in claim 1.

The accompanying drawing shows schematically and by way of example several embodiments of the mechanism of the invention.

BRIEF DESCRIPTION OF THE SEVERAL VIEWS OF THE DRAWINGS

FIG. 1 is a perspective view, partially exploded, of a first embodiment of the mechanism.

FIGS. 2 through 6 show the successive positions of the mechanism for successive rotations of 90° of the primary element of the mechanism.

FIGS. 7 and 8 show an axial cross-section and a longitudinal cross-section of the mechanism in use in an internal combustion engine.

FIGS. 9 to 12 show the positions of the elements of the mechanism for the four cycles, intake, compression, explosion and exhaust, of the motor.

FIG. 13 shows an axial cross-section of the mechanism used as a compressor.

FIGS. 14 to 18 show the successive positions of the mechanism of FIG. 13, showing the operation of the latter as an air compressor.

FIGS. 19 to 23 show the successive positions of a second embodiment of the mechanism for angular increments of 90°, of the primary element; the secondary element is stationary.

FIGS. 24 to 28 show the successive positions of the second embodiment of the mechanism, for increments of 30°, of the secondary element, the intermediate element being stationary.

FIGS. 29 and 30 show two modifications of a third embodiment of the mechanism comprising five transmission members.

FIGS. 31 and 32 show a fourth embodiment of the mechanism in which friction is reduced by the use of rotatable elements.

FIG. 33 shows in plan view and schematically, a modification of the embodiment of the mechanism shown in FIGS. 31 and 32.

FIGS. 34 and 35 show a fifth embodiment of the mechanism.

FIG. 36 is an axial cross-section of a sixth embodiment of the mechanism.

FIGS. 37 to 41 show the positions of the elements of the mechanism of FIG. 36 for successive increments of 90°, of the primary element when the secondary element remains stationary.

FIG. 42 is a longitudinal cross-sectional view of a seventh embodiment of the mechanism.

FIGS. 43 to 47 show the successive positions of the mechanism of FIG. 42 for angular displacements of 90°, of the secondary element, the intermediate element being stationary.

FIGS. 48, 49 and 50 are schematic views of the first embodiment of the mechanism shown in FIGS. 1 to 6, showing a particular fundamental characteristic of the mechanism present in all its embodiments.

FIGS. 51 and 52 are axial and longitudinal cross-sections of an eighth embodiment.

FIGS. 53 and 54 are developed views of the essential portions of the mechanism shown in FIGS. 51, 52 in two different positions of the mechanism.

FIGS. 55, 56 and 57 are longitudinal and axial cross-sections, respectively, of a ninth embodiment of the mechanism.

FIGS. 58 to 62 are longitudinal cross-sections and FIGS. 58A to 62A are axial cross-sections, of a tenth embodiment of the mechanism, showing the successive positions of the latter for increments of 45°, of the primary element, the intermediate element being stationary.

DETAILED DESCRIPTION OF THE INVENTION

The first embodiment of the desmodromic mechanism according to the invention, shown in FIGS. 1 to 6, comprises an input shaft 1 whose end is provided with a primary cam 2 here formed by an eccentric with a track.

This mechanism also comprises an output shaft 3, concentric with the input shaft 1, whose end is provided with a plate 4 comprising axial projections 5 defining between them straight grooves or guides 6. This assembly constitutes an intermediate element of the mechanism.

When mounted in service position, the primary cam 2 is located in the middle of the projections 5 of the intermediate element.

A casing 7 comprises bearings 8, 9 for the input shaft 1 and output shaft 3 and has an internal cavity 10 in which are disposed the plate 4 and the primary cam 2. The peripheral wall of this internal cavity 10 of the casing 7 constitutes a secondary cam comprising in this embodiment two tracks 11, 12.

Movement transmission members 13 are present in the form of cylindrical rollers and are disposed in each of the guides 6 located between the projections 5 of the plate 4 of the intermediate element 3. These transmission members 13 slide without play in the guides 6 between the projections 5 and are in contact by their periphery simultaneously with the primary cam 2 and the secondary cam with two tracks 11, 12. Moreover, these transmission members 13 are in permanent bearing relation against at least one of the lateral surfaces of the guides 6 of the intermediate element. Thus, each transmission member 13 is in permanent contact with the primary cam 2, the secondary cam and the intermediate element.

If the casing 7 is held stationary and the input shaft 1 is rotated, there is obtained the successive positioning of the elements of the mechanism. From FIG. 1 to FIG. 2, the primary element 1 has undergone a rotation of 90°, the track of the primary cam forces the transmission member 13b outwardly, following the profile of the secondary cam, which gives rise to the rotation, in the same direction, of the intermediate member and the output shaft 3.

A subsequent rotation of 90° (from FIG. 3 to FIG. 4) of the input shaft 1 gives rise, by the primary cam track, to the displacement outwardly of the transmission members 13b and 13c, still in contact with the secondary cam, giving rise again to a rotation of 30° of the intermediate element. From the position of FIG. 4 to that of FIG. 5, force is transmitted from the primary cam 2 to the intermediate member by the transmission members 13a and 13c. When the primary cam has undergone a new displacement of 90°, the intermediate element has undergone a new rotation of 30°. Then by a new rotation of 90° of the primary cam 2 (from FIG. 5 to FIG. 6) the transmission members 13a and 13c continue to drive the intermediate element through a new movement of 30°. At this time, the initial configuration of FIG. 2 is resumed, the transmission member 13c having taken the position of the transmission member 13a. The input shaft 1 and the primary cam 2 have undergone a rotation of 360° and having done this have driven desmodromically the intermediate element over an angular distance of 120°, namely ⅓ of the angular distance traversed by the primary element 1. There is thus obtained a speed reduction of 3 to 1 between the input shaft 1 and the output shaft, and this with a gearless mechanism having a minimum of friction, indeed solely rolling movement. The mechanism described is strictly desmodromic, which is to say that the speeds of the elements 1 and 3 are strictly proportional. If the speed of the input shaft 3 is constant, the speed of rotation of the output shaft 3 will also be constant, without any variation, of a value three times less than that of the input shaft 1.

It will be seen that, when the casing is stationary, for an angular movement of the primary cam of 360°, the intermediate element undergoes a rotation in the same direction of 120°, there is thus exactly a ratio of 1 to 3. On the contrary, if it is the intermediate element which is fixed, a rotation of 360° of the primary cam gives rise to a rotation, in the opposite direction, of the casing, of 180°; there is thus in this case a ratio of 1 to 2.

In such a mechanism, the demultiplication ratios are always whole numbers.

Referring to FIG. 49, it will be seen that the transmission member 13a is in contact with the tip of the primary cam 2 and the hollow 11 of the secondary cam. In this position, the tangents to the points of contact of the transmission member 13a with the primary and secondary cams, respectively, are parallel to each other. In this position, the transmission member 13a cannot transmit any torque or any movement.

If the same tangents are traced for the transmission members 13b and 13c, the points of contact of these transmission members with the primary and secondary cams are displaced and are no longer located on a diameter of the transmission member, these tangents then forming an acute angle $\beta$, $\gamma$ between them. It will be noted that these angles $\beta$, $\gamma$ are located one in the clockwise direction and the other in the counterclockwise direction, and hence are opposite. Thus, when the mechanism is stopped, the relative position of the three elements, the primary cam 2, the secondary cam 11, 12 and the intermediate 5, 13, is blocked in one direction by the transmission member 13c and in the other direction by the transmission member 13b. The mechanism accordingly cannot undergo any unintended movement.

On the other hand, when the primary cam 2 is driven in rotation, in the clockwise direction, the transmission member 13b is pressed outwardly, giving rise to a movement of the intermediate element also in the clockwise direction. This is made possible because simultaneously with the rotation of the primary cam 2, the angle $\gamma$ is progressively increased, which permits a passive movement of the transmission member 13c.

Returning to FIGS. 1 to 6, it will be seen that the transmission members are active, for a rotation of the primary cam 2 in the clockwise direction, when they are located in the quadrants II and IV and passive when they are located in the quadrants I and III. Because in the course of rotation of the intermediate element there is always at least one transmission member located in one of the quadrants II and IV and at least one other in one of the quadrants I and III, there will accordingly always be at least one transmission member that is active during rotation of the mechanism. Upon stopping the mechanism, on the other hand, this arrangement ensures that it is blocked in the two directions no matter what the angular position in which the intermediate member has stopped.

It will be seen that the volume of the space 10 contained between the two transmission members 13, the peripheral surface of the projection 5 and the intermediate element in contact with these transmission members 13 and the portion of the internal peripheral surface of the casing 7, or secondary cam, is variable as a function of the rotation of the input shaft 1 and the primary cam 2. This particularity permits designing uses for this mechanism not only as a reducer or multiplier, but also as a motor, a compressor, or a pump.

In the case in which the projections 5 do not ensure sealing of the volume 10, either because the projections comprise passages, or because their height is less than that of the transmission members 13, variable volume 10 is then determined by two adjacent transmission members and the portions of the primary and secondary cams comprised between these two transmission members.

It will be noted that the number of transmission members 13 is equal to the number of tracks of the primary cam 2, increased by the number of tracks 11, 12 of the secondary cam, in this example equal to three.

It will also be noted (FIG. 2) that the distance between the high point of the track of the primary cam 2 and the high point 11 of the secondary cam of the secondary element 7, is equal to the diameter of the transmission member 13, namely the distance comprised between two end points of contact of this transmission member.

The same is true for the distance (FIG. 3) separating the low point of the primary cam 2 and the low point of the secondary cam.

The sum of the length y between the center of the transmission member and its contact with the primary cam, and the length z between the center of the transmission member and its contact with the secondary cam, is equal for all the elements of a same mechanism and invariable in all the positions of operation (FIG. 48).

It will be noted in this arrangement that in the course of the movement of the mechanism, the center O of the three transmission members 13 is permanently located on a circle whose center coincides with the axis X of the primary cam 2. In this case, the primary cam 2 is constituted by an eccentric whilst the secondary cam is constituted by an oval surface. The primary cam 2 is located within the secondary cam.

The frictional or rolling forces are very much reduced, because they are limited to the sliding of the transmission members 13 in their guides 6 and to their rolling against the primary cam 2 and the secondary cam.

From the description of this first embodiment of desmodromic mechanism according to the invention, it will be evident that this mechanism is comprised essentially by a primary cam, a secondary cam and an intermediate element defining linear guides in which slide the movement transmission members; the two cams and the intermediate element are moveable relative to each other.

For clarity and precision of the description which follows, of the different embodiments of the mechanism, first to define that the primary cam can be located within the secondary cam or vice versa, and that the two cams can oppose axially; but always the intermediate element will be located between the two cams.

The two cams can be movable and the intermediate element stationary or one of the cams and the intermediate element can be movable but then the other cam is stationary. One or the other of the cams can be driven, the other cam or the intermediate element being then the driver, or vice versa.

By definition, there will always be meant by the primary cam, that one of the two cams which has the fewer tracks.

FIGS. 7 and 8 show in transverse and longitudinal cross-section, a use of the mechanism described above for implementing an internal combustion engine. For a better understanding and simplification of the description, the same references numerals as in FIGS. 1 to 6 will be used to indicate the corresponding members.

In this use, the casing 7 is maintained stationary and constitutes the motor block. For reasons of construction, it is made of three pieces in this example, two plates 7a and 7b as well as a ring 7c. These three pieces 7a, 7b and 7c are secured to each other in stationary.

The intermediate element comprises a shaft 3 rotating in the two plates 7a, 7b of the casing. This shaft 3 is secured to two flanges 20 interconnected by bridges 21 equivalent to the projections 5 of the first embodiment of the mechanism. These flanges 20 turn without play and in a sealed manner relative to the ring 7c whose intermediate portion of the internal surface constitutes the secondary cam comprising the two tracks 11, 12.

The input shaft 1 is rotatable in the shaft 3 and carries the primary cam 2.

The transmission members 13 are disposed between the bridges 21, the internal surface or secondary cam of the casing 7c, the primary cam 2 and the flanges 20. These transmission members 13 ensure sealed contact between the pieces with which they are in contact and thus delimit three variable volume chambers 10a, 10b, 10c. To limit the friction forces between the primary cam 2 and the transmission members 13, there is provided in this embodiment a needle bearing 22 between an eccentric 23 secured to the shaft 1 and a circular ring constituting the external surface of the primary cam 2.

The ring 7c of the casing also comprises an inlet conduit 24 for a combustible mixture, an exhaust conduit 25 for combustion gases and a spark plug 26, angularly offset by about 120° from each other.

The transmission members 13 can be tubular and provided with sealing means guaranteeing good compression and a low coefficient of friction and rolling.

The four phases of the cycle of operation of the motor are shown in FIGS. 9 to 12. FIG. 9 shows the intake of the gaseous mixture into the variable volume chamber 10c through the conduit 24. The primary cam 2 and the intermediate element turn in a clockwise direction. FIG. 10 shows the motor at the moment at which compression is at the point of reaching the maximum in the variable volume chamber 10c and at which the ignition is caused by the spark plug 26. The rotation of the elements continues, and FIG. 11 shows the motor in the expansion phase of the variable volume chamber 10c; then FIG. 12 shows the exhaust 25 of the variable volume chamber 10c. It is evident that the three variable volume chambers pass through the same four-cycle operation, such that for one complete revolution of the intermediate element 3, 21 each variable volume chamber 10a, 10b, 10c will have an ignition and expansion phase. This having been done, the shaft 1 and the primary cam 2 will have effected three complete turns.

Such a motor therefore has two torque elements: the shaft 1 secured to the primary cam, and the intermediate element 3, the speed of rotation of this intermediate element 3 being three times less than that of the primary element 1.

FIGS. 13 to 18 show another embodiment of the mechanism and its use as a compressor.

The mechanism comprises a casing formed by two flanges 130, 131, of which one comprises a hub 132, connected by a ring 133 whose internal surface 134 constitutes the secondary cam which here has four tracks.

The intermediate element is formed of two flanges 135, 136 connected by bridges 137, provided with air passages 137a, defining between them rectilinear radial guides in which slide the transmission members 138 formed by tubular elements. The connection between each rotatable flange 135, 136 and the fixed ring 133 is sealed.

The mechanism again comprises a primary cam 139 with a track formed by an eccentric secured to an input shaft 140 rotatable in the flange 130 and the hub 132 of the casing.

The transmission members 138 sealingly slide between the flanges 135, 136 but are not sealed in the radial guides and are in permanent and sealed contact with the primary cam 139 and the secondary cam 134. These transmission members thus define with the primary and secondary cams sealed chambers 150 of variable volume, five in number.

This mechanism also comprises at least one inlet opening 141 in the hub 132 of the casing, communicating by a bore 132 in the flange 136 with a distribution sector 143 recessed in one of the side surfaces of the primary cam 139.

This mechanism also comprises an exhaust conduit 144 in the hub 132 of the casing, communicating with a hole 145 provided in the end of the shaft 140 and the primary cam 139, opening toward the periphery of this primary cam.

The distribution sector 143 extends over an angular extent substantially equal to 90°, and one of its ends is diametrically opposite the axis of the hole 145.

In such an arrangement of the mechanism, the casing is stationary, and for a complete revolution of 360° of the input shaft 140 secured to the primary cam 139, the intermediate element undergoes a rotation of 72°, namely ⅕ of a turn.

The operation of the compressor thus produced by the mechanism is the following, with reference to FIGS. 14 to 18. In FIG. 14, the variable volume chamber 150a is at its least volume, isolated from the intake 143 and the exhaust 145. The variable volume chamber 150b is connected to the exhaust 145 whilst the variable volume chambers 150d and e are connected to the intake. Rotation of the input shaft 140 and of the primary cam 139 by 45° gives rise to a rotation of the intermediate element and of the variable volume chambers 150, of 9°, bringing the mechanism into the position shown in FIG. 15.

The variable volume chamber 150a is connected to the intake and the variable volume chamber 150b to the exhaust. The volume of the chamber 150a increases whilst the volume of the chamber 150b decreases, emptying the gas which it contains into the exhaust conduit 144.

Upon further rotation by 45° of the shaft 140, the position shown in FIG. 16 is reached, wherein the chamber 150b is at its smallest volume and it is no longer connected to the exhaust but it is the chamber 150c which is connected also to the exhaust whilst the chambers 150d and e are connected to the intake. Upon a further rotation of the primary cam by 90°, to arrive at the position shown in FIG. 17, the variable volume chamber 150c decreases in volume and expels its contents through the exhaust. Upon a further rotation of the primary cam by 90°, to reach the position shown in FIG. 18, the variable volume chamber 150d expels its contents to the exhaust whilst the chambers 150c and 150b refill because they are connected to the intake.

Due to the rotation of the input shaft 140, the exhaust is connected successively to each variable volume chamber while there volume decreases and the chambers refill during increase of their volume. The mechanism thus constitutes a continuous compressor. The torque necessary for the input shaft 140 to obtain a high rate of compression is reduced by the demultiplication of 5 to 1 of the rotative movement between the input shaft and the intermediate element which defines with the secondary cam the variable volume chambers.

It will therefore be seen that the mechanism according to the invention can be used as a mechanical reducer or multiplier (FIGS. 1 to 6), as an internal combustion engine (FIGS. 7 to 12) or as a compressor or hydraulic or pneumatic motor (FIGS. 13 to 18). It is also used to carry out linear movements for example of jacks, linear actuators of the displacement of elements of indefinite length by replacing racks, chains, etc. Thus, by using the same mechanical principle, several very different applications can be carried out, which renders this mechanism particularly polyvalent.

In what follows, there will be described several more embodiments and variations of the mechanism which, although they refer to the use as a speed reducer or multiplier, can of course be used in the concepts mentioned above.

The embodiment of the desmodromic mechanism according to the invention shown in FIGS. 19 to 23 comprises an input shaft 1 secured by a primary cam 2 to a track and a fixed casing 7 having a secondary cam with three tracks formed by the internal peripheral wall of the casing 7.

The intermediate element in this case comprises an output shaft secured to a plate 4 having four projections 5 uniformly spaced about its circumference and defining between them four guides 6 receiving the transmission members 13, sliding without play in these guides and bearing against the primary cam 2 and the secondary cam and these projections 5.

In this embodiment, if the casing 7 is maintained stationary and successive rotations of 90° are imposed on the primary cam 2, there are obtained the successive positions illustrated in FIGS. 19 to 23. When the primary cam 2a performs one complete revolution, passing from FIG. 19 to FIG. 23, the intermediate element 4, 5 has carried out a rotation of 90° as shown by the position of projection 5a and the transmission member 13a.

The sum of the tracks of the primary cam 2 and of the tracks of the secondary cam 7 is four, equal to the number of transmission members 13.

In this example, there is a demultiplication ratio of 4:1 between the angular movements of the input shaft 1 secured to the primary cam 2 and the intermediate element 3, 5. The two shafts 1, 3 turn in the same direction.

In FIGS. 24 to 28, there are shown the successive positions of a mechanism identical to that of FIGS. 19 to 23 but in which it is the intermediate element 4, 5 which is maintained stationary. Thus, for each rotation of 90° of the input shaft 1 and of the primary cam 2 in the direction of the arrow F, it will be seen that the casing 7 performs a rotation in the reverse direction of 30°. Thus, for one turn of the primary cam 2 in the clockwise direction there is obtained a rotation of 120° of the casing 7 in the counterclockwise direction, the track A of this casing passing from its position shown in FIG. 24 (noon) to that shown in FIG. 28 (8 a.m.).

For one complete revolution of the primary cam 2, the casing performs a rotation of ⅓ of a turn in the reverse direction. There is thus carried out a demultiplication of 3 to 1.

In the embodiment shown in FIG. 29, the input shaft 1 has an eccentric 30 on which is idly mounted a tubular primary cam 31 via a needle bearing 32. This primary cam 31 has a single track.

The intermediate element, secured to the output shaft 3, comprises a plate 4 provided with five projections 5 uniformly disposed about the axis of said plate 4 and defining five rectilinear radial guides 6 each receiving one transmission member 13 sliding without play in these guides and the transmission members 13 are tubular to reduce the inertia and deform slightly during rotation of the system and prevent play upon stopping.

The internal peripheral wall of the casing 7 has four tracks 33 which constitute the secondary cam.

The number of transmission members 13 is equal to the sum of the tracks of the primary cam 31 and the tracks 33 of the secondary cam, namely five. If the casing 7 is maintained stationary, there is obtained for each complete revolution of the primary cam 30, 31 an angular displacement in the same direction of the intermediate element 4, 5 of 72°, namely ⅕ of a turn.

In the modification of this third embodiment shown in FIG. 30, the shape of the secondary cam is different although it also comprises four tracks 34. The rule of the sum of the values y, z applies to these two variations.

In these two variations also, the distance separating the low point of the primary cam 2 from each low point of the secondary cam is equal to the diameter of a transmission member, as is also the distance separating the high point of the primary cam from each high point of the secondary cam when these points are aligned across a diameter of the mechanism.

Here again, the center of the transmission members 13 is always located on a circle whose center coincides with the axis of the eccentric and hence of the primary cam 30.

FIGS. 31 and 32 show an embodiment of the mechanism comprising an input shaft 41 secured to a central drum 42 carrying at each of its axial ends a primary cam with one track 43, these cams 43 being exactly aligned angularly. This input shaft 41 rotates in an intermediate element comprising two flanges 44 each secured to a bearing 45, located on opposite sides of the primary cams 43. These bearings freely pivot in the casing formed by two lateral flanges 46 interconnected by a ring 47 whose central section 48 of the internal surface constitutes the secondary cam.

The primary cam 43 is constituted by an eccentric comprising one track and the secondary cam 48 by a casing having seven tracks uniformly distributed about the axis of the mechanism.

This mechanism also comprises eight transmission members, each constituted by an axle 49 bearing a central roller 50 coacting with the secondary cam 48 and two lateral rollers 51 coacting respectively each with one of the primary cams 43. The axles 49 slide without play in radial slots 52 of the flanges 44 of the intermediate element and serving as guides to the transmission members.

There will be found in this embodiment the same criteria regulating the number of transmission members 49, 50, 51 which is equal to the sum of the tracks of the primary cam 43 and the seven tracks of the secondary cam 48, namely, in this case, eight.

The same is true for the separating distances, taken on the radius of the mechanism, the high and low points respectively of the primary and secondary cams are equal to the diameter of the transmission members. The axles 49 of the transmission members are disposed about a circumference whose center coincides with the axis of the eccentric 43.

In this embodiment, the intermediate element and its output shaft 45 perform ⅛ of a turn when the primary cam 43 and its input shaft 41 carry out one complete revolution. There is therefore a ratio of 8 to 1. This embodiment permits transmitting high torque, almost all the friction being avoided by the rotation of the assembly of the rollers forming the transmission members.

FIG. 33 shows a modification of this embodiment in which one of two transmission members 51 has been omitted. The secondary cam 48 again comprises seven tracks, the primary cam 42 one track, but the number of transmission members 52 is four. This does not modify the demultiplication ratio, which again is equal to ⅛. This solution permits simplifying the production for uses in which the cost is important and the input torque low.

In this embodiment, the intermediate member is of the type of that shown in FIGS. 1 to 6 for example, and comprises a plate 4 provided with projections 5 constituting the linear guides. The transmission members 52 are constituted by cylindrical rollers.

In the embodiment shown in FIGS. 34 and 35, the mechanism comprises an input shaft 61 comprising two angularly opposite eccentrics 62 forming together a primary cam with two tracks.

The intermediate element comprises an output shaft 63 carrying a plate 64 provided with three projections 65 defining between them the radial rectilinear guides for the transmission members 66 juxtaposed two by two in each of these guides and each coacting with one of the eccentrics 62. One of the ends of the input shaft 61 is journelled in the output shaft 63 whilst the other is journelled in a half 67 of the casing 67, 68.

The casing 67, 68 has on its internal surface of each of its halves 67, 68 a secondary cam 69, 70 each with two tracks. The secondary cams 69, 70 are offset by 90° so as to form a secondary cam with four tracks total.

The sum of the tracks of the primary cam 62 and of the tracks of the secondary cam 69, 70 is six, equal to the number of transmission members 66.

When the primary input shaft 61 carries out one complete turn, the output shaft 63 of the intermediate element performs a rotation of 120° as in the first embodiment described, the demultiplication ratio being three.

It will be seen from the description of the preceding embodiments and of their operation, that the ratio of the speeds of movement, for a mechanism whose casing is fixed, is equal to the number of tracks of the secondary cam increased by the number of tracks of the primary cam, divided by the number of tracks of the primary cam, namely (3+1):1=4 in the example of FIGS. 19 to 23 and (7+1):1=8 in the example of FIGS. 31, 32, 33 and (6+2):2=3 in the example of FIGS. 34, 35. The input and output shafts turn in the same direction. For a secondary cam with four tracks= 360°:4=90°; six transmission members 360°:6=60°; 90°–60°=30°; 90°:30°=3; demultiplication 1:3; 60°:30°=2, demultiplication 1:2.

On the contrary, when it is the intermediate element which is maintained fixed, a rotation of one complete turn of the casing gives rise to a rotation of the primary cam or of the input shaft equal to the number of tracks of the secondary cam divided by the number of tracks of the primary cam, namely three in the example of FIGS. 24 to 28. In this case, the casing rotates in the reverse direction from the input shaft.

It will also be seen that the number of transmission members is generally equal to the number of tracks of the secondary cam increased by one.

In the embodiment shown in FIGS. 36 to 41, the input shaft 1 carries a primary cam 2 with two tracks. The intermediate element or output shaft 3 comprises a plate 4 provided with projections 5 defining eight guides 6 for the transmission members 13, which are eight in number. The casing 7 has an internal peripheral surface forming the secondary cam which has six tracks. The casing 7 being maintained fixed, the output shaft 3 turns four times less quickly than the input shaft 1, which corresponds to the number eight, divided by the number of tracks of the primary cam, two. The two shafts 1 and 3 turn in the same direction.

In the embodiment shown in FIGS. 42 to 47, the shaft 1 is provided with a secondary cam 2 with four tracks disposed symmetrically about this axis. The intermediate element is constituted by a housing 80 pivoted on the input shaft 1 on opposite sides of the secondary cam 2. This housing 80 has five holes 81 provided in its peripheral wall, uniformly spaced about the axis of this housing 80 and constituting recesses or guides for the transmission members constituted by the spherical balls 82.

The primary cam is in this instance formed by a ring 83 pivoted on the housing 80 and of which the internal surface 84, which is eccentric, constitutes the primary cam which in this case has a single track.

If the intermediate element 80 is maintained stationary, one complete revolution of the ring 83 in a clockwise direction gives rise to the rotation of ¼ of a turn in the reverse direction, of the shaft 1. There is thus precisely achieved a demultiplication ratio of 1 to 4, namely, in this case, equal to the number of tracks of the secondary cam divided by the number of tracks of the primary cam. The number of transmission members 82 is equal to the number of tracks of the secondary cam increased by the number of tracks of the primary cam, namely five. If the input shaft 1 provided with the four tracks of the secondary cam 2 is maintained fixed, the intermediate element 80 will turn five times less rapidly than the primary cam 83 but in the same direction. The ratio will accordingly be 1 to 5.

In all the embodiments of the mechanism, the transmission members are always permanently in contact with the primary and secondary cams and with the intermediate element in which they slide radially.

This mechanism, which therefore has no play, permits a perfect desmodromic transmission of the movement of one element on another. There is a continuous sliding or rolling of the transmission members which have a perfectly smooth contact surface, circular or spherical, on the primary cam and simultaneously on the secondary cam. It should be noted that this arrangement of the cams permits providing coaxial speed reducers whose housing turns more rapidly than the central shaft, which is the reverse of all known existing systems.

The form of the transmissions can vary. They generally have, however, a spherical or cylindrical peripheral portion of circular cross-section which is in contact with each of the primary and secondary cams.

It will be noted that in all the embodiments described up to now, the transmission members slide radially and perpendicularly relative to the axis of the mechanism.

The embodiment of the desmodromic mechanism described with respect to FIGS. 51 to 54 operates again according to the same principle but this embodiment is original and is particularly suitable for reducers of small diameter having high demultiplication ratios.

This mechanism is inscribed within a tube or tubular envelope 90 closed at its two ends by flanges 91 giving passage to an input shaft 92 and respectively an output shaft 93.

In this embodiment, the primary and secondary cams are no longer disposed one within the other but axially in alignment one behind the other within the tubular envelope 90. This arrangement permits providing several stages of reduction one after the other and obtaining with three stages for example a reduction of 1 to 1000 and this in a diameter less than 8 mm and a length less than 25 mm.

The input shaft 92 is secured to a cylindrical element 94 pivoted in the envelope 90 having on its front surface a surface 95 constituting the primary cam comprising a track.

A tubular partition 96 positions a fixed secondary cam 97 constituted by an annular bell cam comprising four tracks. A first intermediate element 98 is pivoted coaxially on the envelope 90. This intermediate element 98 passes through the central opening of the bell cam 97 and has a hub grooved in the direction of the primary cam 95. This hub comprises five throats or grooves 99 in which are disposed five balls 100 constituting the transmission members. The axial position of the secondary cam 97 and of this intermediate element 98, defined by the tubular partition 90, are such that when one ball 100 is in contact with the top of the track of the primary cam 95, this ball will be in contact with the secondary cam 97 in the deeper one of its tracks.

FIGS. 53 and 54 show schematically the primary cam 95 and secondary cam 97 as well as the five balls 100 in a linear development in two different positions of the mechanism.

The demultiplication ratio of such a stage is equal to the number of tracks of the secondary cam increased by the number of tracks of the primary cam, divided by the number of tracks of the primary cam, in this case (4+1):1=5; or according to the formula: secondary cam 360°:4=90°; transmission members 360°:5=72°; 90°−72°=18°; 90°:18°=5.

The free front surface of the intermediate element 98 itself also has a primary cam 95a acting on the balls 100a sliding axially in a second intermediate element 98a and coacting with the four tracks of the second secondary cam 97 thereby forming a second demultiplication stage identical to the first.

A third demultiplication stage of the mechanism is constituted by a third primary cam 95b disposed on the front surface of the second intermediate element acting on the balls 100b sliding axially in a hub 101 of the output shaft and coacting with the tracks of a third secondary cam 97b.

In this embodiment, the primary and secondary cams are coaxial and facing, the secondary cams 97 are fixed, whilst the primary cams 95 turn about the axis of the assembly and of the input shaft 92 and output shaft 93.

In a modification, it is evident that the number of tracks of the secondary cams 97, 97a, 97b of the different stage of demultiplication can be different, the number of grooves 99 of the intermediate element 98 and of the transmission members 100 varying as a result. Thus, a very large choice of ratios, always whole numbers, is available.

It will also be noted here that the tangents to the points of contact of at least two balls 100 with the primary cam 95 and secondary cam 97 form angles β, γ extending in opposite directions, preventing any movement of the mechanism when it is stopped.

The embodiment of the mechanism according to the invention shown in FIGS. 55 to 57 constitutes a jack or a linear mechanical actuator, again based on the same principle of actuation and of demultiplication.

This mechanism comprises a fixed body 110 forming an intermediate element on which is journalled a ring 111 whose eccentric internal surface 112 constitutes the primary cam and one track of the mechanism. A linear actuating rod 113, cylindrical or polygonal, slides in the body 110 and comprises at its end portion disposed in the body, at least one hourglass-shaped portion 114 constituting the secondary cam.

Holes 114, four in the illustrated example, pass through the body radially. These holes are angularly offset by 90° from each other and axially by a distance equal to ¼ of the length L of the secondary cam 114 of hourglass shape. The arrangement of these holes 115 relative to the secondary cam 114 is such that the latter comprises by analogy three tracks.

Transmission members constituted by spherical balls 116 are slidably mounted in the holes 115 and are in permanent contact with the body 110 and each of the primary cam 112 and secondary cam 114.

For one complete revolution of the ring 112 and hence of the primary cam, there is obtained a linear displacement of the actuating rod 113 of a length L of the secondary cam of hourglass shape.

There are in this embodiment acute angles β and γ between the tangents to the points of contact of two balls 116 with the primary cam 112 and secondary cam 114, ensuring blocking of the mechanism when it is stopped.

FIG. 57 shows the mechanism when the ring 111 has carried out ¼ of a turn from the position shown in FIG. 54.

The two balls have advanced relative to the rod 113 by a quarter of the length of the hourglass-shaped cam.

This embodiment of the mechanism is particularly interesting because the actuating rod 113 can, independently of its linear movements controlled by the ring 111, carry out movements of rotation about itself without changing its axial position.

The final embodiment of the mechanism, shown in FIGS. 58 to 62A, is also a linear displacement mechanism. It comprises a frame 120 constituting the intermediate element, in this case H-shaped in longitudinal cross-section. In the upper portion of the frame, between the legs of the H, is journalled an input shaft 121 secured to the primary cam, here comprised by four eccentrics 122a, b, c, d angularly offset by 90° relative to each other and representing the track of the primary cam. The horizontal bar of the H of frame 120 comprises four holes 123 each aligned with one of the eccentrics 122a, b, c, d, constituting the guides for the balls 124 comprising the transmission members.

In the lower portion of the frame 120 is provided a space in which slides longitudinally, parallel to the axis of the input shaft 121, a portion of,a rod or bar 125 that is displaceable linearly on the rollers 126. The upper surface of this bar 125 facing the holes 123 of the frame 120 has a secondary cam 127 formed by successive hollows which constitute the tracks of this secondary cam. The distance D corresponding to the length of three successive tracks is equal to four times the interaxial distance of the holes 123.

The smooth balls 124 are permanently in contact each with one of the eccentrics 122a, b, c, d of the primary cam and with the secondary cam and bear on the frame 120. This assembly corresponds to a mechanism comprising one primary cam with one track and one secondary cam with three tracks.

For one complete revolution of the input shaft 121 and hence of the primary cam 122, there is obtained a linear movement of the bar equal to ⅓ of the distance D, namely equal to the extent of one track of the secondary cam.

In this embodiment also, the tangents to the point of contact of two balls 124 with the primary cam 122 and secondary cam 125 form opposite acute angles β and γ such that the elements 120, 121 and 125 of the mechanism are blocked when the input shaft 121 is not driven in rotation.

In modifications, the transmission members can comprise a cylindrical body and rounded ends. This transmission members can also be formed by the juxtaposition of several rotating elements to limit friction.

In all of the embodiments of the mechanism, the primary cam is the one of the two cams which has the fewer tracks. In all embodiments of the mechanism, except the one shown in FIGS. 52 to 54, the guide axles of the rectilinear guides of the intermediate element are disposed radially and/or perpendicularly to the axis of the mechanism.

In the embodiment shown in FIGS. 52 to 54, by contrast, the guide axles of the guides of the intermediate element are disposed parallel to the axis of the mechanism.

In embodiments of the mechanism not shown, it can be provided that the transmission members are connected to the intermediate element or to the body of this intermediate element by other means than the rectilinear guides in which they slide. Thus, each transmission member can be connected to the body of the intermediate element by a rod articulated on the body of the intermediate element and carrying the transmission member. In such an arrangement, there is no friction but only rolling of the transmission members on the primary and secondary cams and on the body of the intermediate element. In such an arrangement, the movement of the transmission members relative to the body of the intermediate element takes place along an arc of a circle, namely, along an curvilinear and nonrectilinear path.

What is claimed is:

1. A desmodromic mechanism comprising:
    plural movement transmission members, each having axial ends, said transmission members being connected to and bearing on an intermediate element;
    a primary cam in permanent contact with each of said transmission members;
    a secondary cam in permanent contact with each of said transmission members,
    wherein said transmission members have contact surfaces that are shaped to ensure permanent and simultaneous contact with said primary and secondary cams,
    said primary cam, said secondary cam and said intermediate element being assembled with each other so as to move rotatably and/or linearly relative to each other and with invariable differential speeds for all positions of the desmodromic mechanism,
    said intermediate element having rectilinear guides, said guides having guide axles, said transmission members freely sliding in said guides;
    a space being formed between two adjacent one of said transmission members, a portion of a body of said intermediate element being between said two adjacent transmission members, and a portion of said secondary cam being between said two adjacent transmission members; and
    two bearing surfaces in contact with said axial ends of said transmission members and said portion of said body and said portion of said secondary cam defining a sealed variable volume chamber as a function of a relative position of said primary and secondary cams and of said intermediate element.

2. The mechanism according to claim 1, wherein said variable volume chamber has a first volume comprising passages between said intermediate element, two adjacent ones of said transmission members, said primary cam and said secondary cam, and a second volume bounded by front surfaces of said transmission members and bearing surfaces of said transmission members.

3. The mechanism according to claim 2, wherein said primary cam has fluid distributing openings selectively placed about a periphery of said primary cam.

4. The mechanism according to claim 3, wherein at least one of said openings disposed on the periphery of said primary cam is in simultaneous communication with two adjacent variable volume chambers.

5. The mechanism according to claim 1, wherein said secondary cam has fluid distributing openings selectively placed about a periphery of said primary cam.

6. The mechanism according to claim 1, wherein said guide axles are disposed radially and/or perpendicularly to an axis of the desmodromic mechanism.

7. The mechanism according to claim 1, wherein said transmission members are provided with a resiliently deformable bandage.

8. A desmodromic mechanism comprising:
    plural movement transmission members having a known number of transmission members connected to and bearing on an intermediate element;
    a primary cam in permanent contact with each of said transmission members;

a secondary cam in permanent contact with each of said transmission members, wherein said transmission members have contact surfaces shaped to ensure permanent and simultaneous contact with said primary and secondary cams, said primary cam, said secondary cam and said intermediate element being assembled with each other so as to move rotatably and/or linearly relative to each other and with invariable differential speeds for all the positions of the desmodromic mechanism;

a body forming said intermediate element, said primary cam comprising a ring pivoted about said body, said ring having an internal eccentric surface, said secondary cam and a rod being movable axially in said body;

a portion of said rod located within said body, said secondary cam having at least one region having an hourglass shape due to the rod being within said body, said body having rectilinear guides having guide axles, said guides being uniformly distributed about a periphery of said body, said guides being offset axially from each other, and said transmission members moving radially in said guides perpendicular to the axis of the desmodromic mechanism, said transmission members being permanently in contact with said primary cam and with said secondary cam as well as with said intermediate element.

9. The mechanism according to claim 8, wherein said guides have an axial offset equal to a length of the hourglass-shaped region of said secondary cam divided by said number of said transmission members.

10. The mechanism according to claim 8, wherein said intermediate element has a frame supporting an input shaft, and said primary cam has a track having several eccentrics angularly offset relative to each other, each of said eccentrics having a same amplitude and a same offset axially along said input shaft, said frame having openings aligned with said eccentrics; and further comprising a bar being mounted linearly displaceably relative to said frame, parallel to the input shaft, said bar having a surface facing said openings, said surface having successive hollows forming said secondary cam; and said transmission members sliding in said openings and permanently contacting with one of said eccentrics and said secondary cam and bear on said frame.

11. The mechanism according to claim 10, wherein a distance D corresponding to a length of a number of successive recesses of said secondary cam, said number of successive recesses being equal to said number of said transmission members less one, is equal to an interaxial distance between two of said eccentrics of said primary cam multiplied by the number of said transmission members.

12. The mechanism, according to claim 8, wherein said guide axles are disposed radially or perpendicularly to an axis of the desmodromic mechanism.

13. The mechanism according to claim 8, wherein said transmission members are provided with a resiliently deformable bandage.

* * * * *